Sept. 26, 1961 B. A. TREVOR 3,002,088
AGC FOR SINGLE SIDEBAND RECEPTION
Filed Feb. 15, 1960
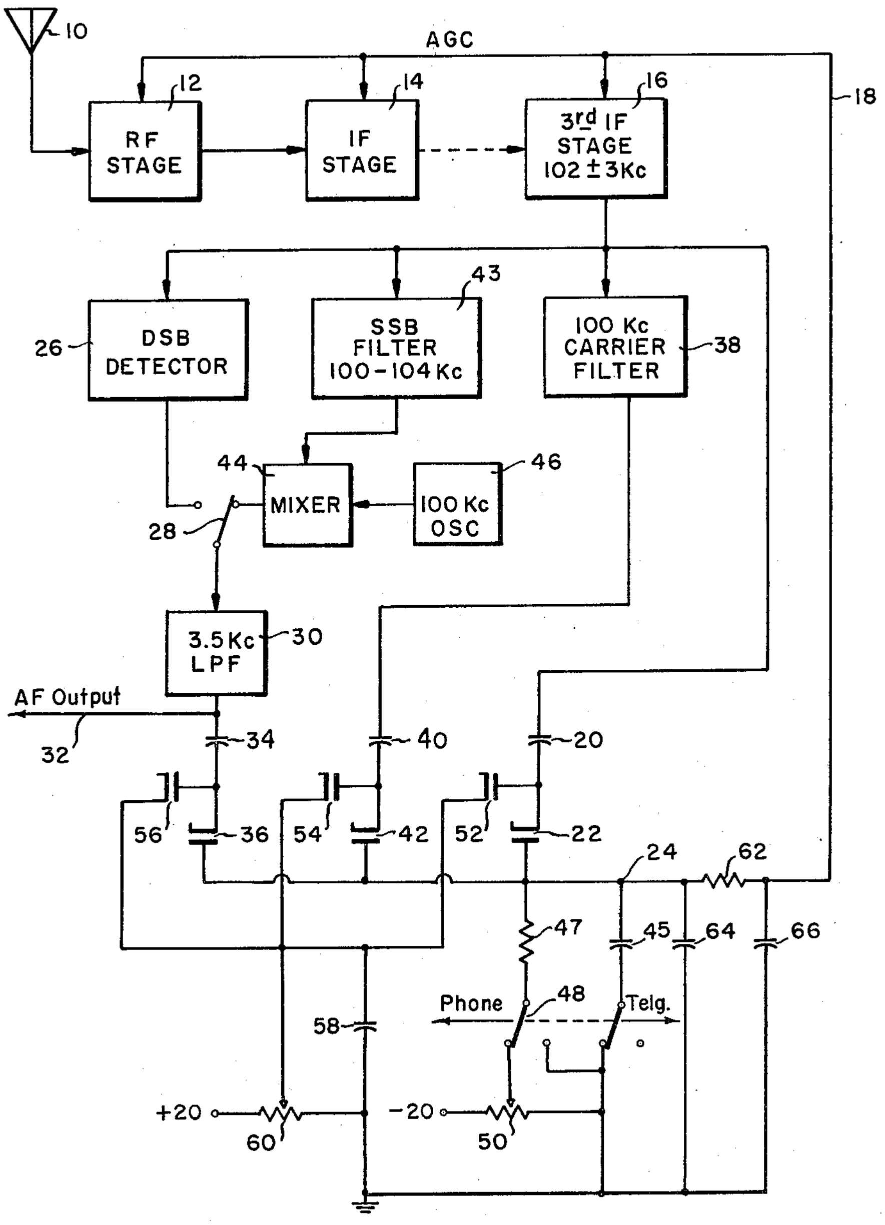
INVENTOR
BERTRAM A. TREVOR
BY
ATTORNEYS United States Patent Office 3,002,088

Patented Sept. 26, 1961

3,002,088

AGC FOR SINGLE SIDEBAND RECEPTION

Bertram A. Trevor, Tucson, Ariz., assignor, by mesne assignments, to the United States of America as represented by the Secretary of the Navy Filed Feb. 15, 1960, Ser. No. 8,893
7 Claims. (Cl. 250—20)

This invention relates to an automatic gain control for single sideband reception with complete or partial suppression of the transmitted carrier and more particularly to an automatic gain control which will operate on single or double sideband signals for voice, radio Teletype, or digital data transmission.

In the past it has been common practice, with voice modulation, to transmit a partially suppressed carrier to be used at the receiver for automatic frequency control and automatic gain control purposes. More recently it has been considered feasible to provide the required frequency accuracy and stability in the HF band (2–30 mc.), such that automatic frequency control is not needed.

In order to conserve spectrum space and transmitter power, it is considered desirable to highly suppress the carrier when such frequency accuracy is available.

The primary object of this invention is to disclose a preferred means for obtaining automatic gain control with a number of different types of modulated signals.

Another object of this invention is to disclose an automatic gain control having a threshold control whereby the maximum gain of a receiver may be set so as to receive intelligible signals and discriminate against objectionable noise.

Other objects and many of the attendant advantages of this invention will be readily appreciated as the same becomes better understood by reference to the following detailed description when considered in connection with the accompanying drawings wherein the single figure of the drawings is a diagram of the automatic gain control.

Referring to the single drawing, a block diagram of a radio receiver is shown including an antenna 10, RF amplifier stage 12, and a plurality of IF stages 14 and 16 where a common automatic gain control line 18 varies the stage gain.

As an example, the third IF stage 16 has a 6 kc. bandwidth suitable for passing a double sideband signal having a carrier at 102 kc. and applies the signal through capacitor 20 and negative output diode rectifier 22 to AGC input line 24. IF stage 16 also is connected through double sideband detector 26, switch 28 and filter 30 to audio frequency output 32 and from filter 30 through capacitor 34 and negative output diode 36 to AGC input line 24 so that either the IF or AF signal may set the AGC level.

For a single sideband signal operating with a 100 kc. carrier, a 100 kc. carrier filter 38 is connected to IF stage 16 and energizes the AGC input line 24 through capacitor 40 and negative output diode 42. In order to recover the audio signal and to further energize the AGC input line 24, a single sideband filter 43 having a 100–104 kc. bandwidth is connected to IF stage 16 and has an output to a conventional mixer 44 where it is mixed with a very stable 100 kc. signal from oscillator 46. The mixer 44 output signal is connected through switch 28 and filtered by 3.5 kc. low pass filter 30 to remove any radio frequencies so that it may be passed to the audio output 32.

In the case of a single sideband transmission without a completely suppressed carrier, the 100 kc. carrier filter 38 may be adjusted to predominate so that all AGC voltage is derived from this source if desired. Since the carrier fading does not usually correspond with sideband fading, a long AGC time constant is provided by capacitor 45 and resistor 47.

In the case of a single sideband transmission with completely suppressed carrier, there will be no output from the carrier filter 38, and IF rectifier 22 and AF rectifier 36 will provide the AGC voltage. Due to the very irregular voice envelope or signal during phone operation and the absence of any signal on single sideband, suppressed carrier operation when there is no modulation, capacitor 45 and the AGC filter circuit provide a two second AGC time constant as connected by DPDT switch 48.

In the presence of an interfering signal at 99 kc., for example, diode 22 will develop a large AGC voltage which will prevent receiver overload, since the 99 kc. signal would not be passed by 100–104 kc. SSB filter 43 or 100 kc. carrier filter 38.

In the case of a completely suppressed carrier, there is no signal to drive the AGC circuits between pauses in the conversation.

In the HF band (2–30 mc.) atmospheric noise levels vary widely throughout the 24 hour day. The usual automatic gain control circuit would allow the noise output of the receiver, in the absence of signal, to reach full speech volume. This is an undesirable situation, especially in network operation where long idle periods may occur. A threshold control, potentiometer 50, is provided which may be manually adjusted to set the maximum gain of the receiver, in the absence of a signal, such that the noise output is at an acceptable low volume. In the presence of a signal, the automatic gain control arrangement will then operate on any signal stronger than the noise to properly regulate the voice volume. As the noise level changes throughout the day the threshold control may be readjusted as desired. Another requirement is to use a fast attack and slow release AGC time constant so that the receiver gain will quickly reach approximately the desired value on the first transmitted syllable while the slow release prevents excessive increase of gain between words.

Positive output diodes 52, 54 and 56, capacitor 58, and potentiometer 60 provide a delayed bias by varying the charge on capacitors 20, 40 and 34 to allow adjustment of the maximum receiver output for strong signal inputs.

Switch 48 in the Telg. position disconnects capacitor 45 and threshold control 50 so that resistors 47 and 62 and capacitors 64 and 66 provide a four millisecond fast AGC time constant during frequency shift transmissions where a carrier or modulation is always present.

In a preferred embodiment of the automatic gain control, the voltages are as shown on the drawing and the following circuit components are used:

Diodes 22, 36, 42, 52, 54, 56—½ of 6AL5
Resistors 47 and 62—1 megohm
Resistor 60—10K ohms
Resistor 50—100K ohms
Capacitor 45—2 μf.
Capacitors 34 and 58—1 μf.
Capacitors 20 and 40—.01 μf.
Capacitors 64 and 66—.004 μf.

The automatic gain control as disclosed provides automatic gain control for a number of types of modulation including frequency shift, double sideband voice, and single sideband voice with or without a suppressed carrier.

Obviously many modifications and variations of the present invention are possible in the light of the above teachings. It is therefore to be understood that within the scope of the appended claims the invention may be practiced otherwise than as specifically described.

What is claimed is:

1. An automatic gain control for radio reception comprising a radio receiver having a variable gain means and an IF output, a first capacitor connected to said IF output for voltage delay, a first diode connected to said capacitor having a negative AGC output, a second diode connected to said capacitor having a positive output, a carrier filter connected to said IF output, a second capacitor connected to said carrier filter, a third diode connected to said second capacitor having a negative AGC output, a fourth diode connected to said capacitor having a positive output, detecting means connected to said IF output for providing an audio frequency output, a third capacitor connected to said audio frequency output, a fifth diode connected to said third capacitor having a negative AGC output, a sixth diode connected to said third capacitor having a positive output, a variable voltage source connected to the positive outputs of said second, fourth, and sixth diodes for varying the conduction level of said diodes and charging of said capacitors whereby the voltage delay of full application of AGC voltage to said receiver may be varied, a common threshold control connected to the negative outputs of said first, third, and fifth diodes for setting the maximum gain of said receiver to a predetermined value whereby maximum sensitivity with a minimum amount of objectionable noise may be provided, a capacitor connected to said diode negative AGC output to provide a relatively long AGC time constant for phone signals, a switch connected to said capacitor for varying said long time constant to a short time constant for telegraph signals, and means connected between said variable gain means and said negative AGC output for filtering said AGC output.

2. An automatic gain control for single sideband reception comprising a radio receiver having a variable gain means and an IF output, a first AGC rectifier connected to said IF output for varying said variable gain means, a carrier frequency filter connected to said IF output, a second AGC rectifier connected to said filter for varying said variable gain means, detecting means connected to said IF output for providing an audio frequency output, a third AGC rectifier connected to said detecting means for varying said variable gain means, and a common threshold control connected to said rectifiers for setting the maximum gain in said receiver in the absence of any signal without an objectionable noise output.

3. An automatic gain control according to claim 2 and further characterized by means connected to said rectifiers for delaying the full application of automatic gain control to said receiver until the IF output has risen to a predetermined value.

4. An automatic gain control according to claim 2 and further characterized by said detecting means additionally comprising a single sideband filter and mixer whereby an audio frequency output is provided.

5. An automatic gain control according to claim 2 and further characterized by said detecting means additionally comprising a double sideband detector whereby an audio frequency output is provided.

6. An automatic gain control according to claim 2 and further characterized by capacitor means connected to said rectifiers so as to provide a fast response of said variable gain means to an increase in said IF output and a slow response of said variable gain means to a decrease in said IF output.

7. An automatic gain control according to claim 6 and further characterized by switching means connected to said energy storage means for varying the response time of said variable gain means to provide optimum automatic gain control for variable amplitude and constant amplitude IF outputs.

References Cited in the file of this patent

UNITED STATES PATENTS

| | | |
|---|---|---|
| 2,159,780 | Chittick | May 23, 1939 |
| 2,303,542 | Goddard | Dec. 1, 1942 |
| 2,491,918 | Boer et al. | Dec. 20, 1949 |
| 2,617,929 | Spindler | Nov. 11, 1952 |
| 2,771,546 | Schock | Nov. 20, 1956 |
| 2,783,372 | Peterson et al. | Feb. 26, 1957 |